United States Patent [19]
Shibusawa et al.

[11] Patent Number: 5,814,170
[45] Date of Patent: Sep. 29, 1998

[54] MANUFACTURING METHOD FOR A WOOD COMPOSITE LAYERED MATERIAL

[75] Inventors: Tatsuya Shibusawa; Sumire Kawamoto; Hideaki Korai; Tsuyoshi Fujii, all of Ibaragi, Japan

[73] Assignee: The Forestry and Forest Research Institute, Japan

[21] Appl. No.: 806,017

[22] Filed: Feb. 24, 1997

Related U.S. Application Data

[62] Division of Ser. No. 753,897, Dec. 2, 1996.

[30] Foreign Application Priority Data

Aug. 22, 1996 [JP] Japan ................................. 8-238673

[51] Int. Cl.⁶ .............................. B32B 5/28; B32B 31/18
[52] U.S. Cl. ...................... 156/62.2; 156/296; 156/259; 264/112; 181/208; 181/290; 181/294
[58] Field of Search ................... 156/62.2, 62.8, 156/77, 296, 259; 264/112, 113; 181/290, 294, 208

[56] References Cited

U.S. PATENT DOCUMENTS

| | | |
|---|---|---|
| 3,424,270 | 1/1969 | Hartman et al. ................. 181/290 |
| 3,616,128 | 10/1971 | Pasourek . |
| 3,658,635 | 4/1972 | Eustice ........................ 181/290 X |
| 3,790,417 | 2/1974 | Paterson et al. .................. 156/62.8 |
| 4,195,713 | 4/1980 | Hagbjer et al. .................. 181/208 |
| 4,569,873 | 2/1986 | Robbins . |
| 4,810,551 | 3/1989 | Chu . |
| 4,908,930 | 3/1990 | Wycech . |
| 4,923,034 | 5/1990 | Okuzawa et al. ............... 181/290 X |
| 5,439,749 | 8/1995 | Klasell et al. . |
| 5,441,787 | 8/1995 | Fujii et al. . |

OTHER PUBLICATIONS

J.D Snodgrass, et al., "Particleboard of Aligned Wood Strands", *Proceedings of the 7th Washington State University Symposium on Particleboard,* 1974, Editor: Maloney, Thomas M., Washington State University, Pullman, Washington, pp. 415–448.

J.A. Youngquist et al., "Opportunities for Combining Wood with Nonwood Materials", *Proceedings of the 23rd Washington State University International Particleboard/Composite Materials Symposium,* 1989, Editor: Maloney, Thomas M., Washington State University, Pullman, Washington, pp. 141–157.

S. Sueyoshi, et al., "Dynamic behavior of wood strip over elastic underlayment composite flooring subjected to light impact loads," *Wood Science and Technology,* vol. 25, 1991, No. 4, pp. 309–318 ISSN–0043–7719.

*Primary Examiner*—Michael W. Ball
*Assistant Examiner*—Sam Chuan Yao
*Attorney, Agent, or Firm*—Barry R. Lipsitz; Ralph F. Hoppin

[57] ABSTRACT

A multi-layered composite building material is provided which allows effective utilization of forest resources by using so-called low quality materials such as small-diameter wood, old wood, pieces of wood produced as byproducts of lumbering, and/or bamboo. The material can meet various requirements and properties, and can be produced at a low cost. In a structural layer, an adhesive agent is applied to a plurality of finely split pieces which are formed by finely splitting a raw material such as wood or bamboo. The finely split pieces are arranging in parallel to a fiber direction. A shock/vibration-absorbing layer is formed by applying an adhesive agent to small pieces of wood and bamboo and the like. Structural layers and shock/vibration-absorbing layers are alternately arranged to provide a multi-layered structure. The structure is press-molded to a predetermined thickness and optionally heated such that the layers are adhered together to produce the composite multi-layered material. The shock/vibration-absorbing layer may be mixed with resin formed, for example, as a pellet shape, to provide a mixed vibration-absorbing material with improved properties.

17 Claims, 16 Drawing Sheets

F I G. 10
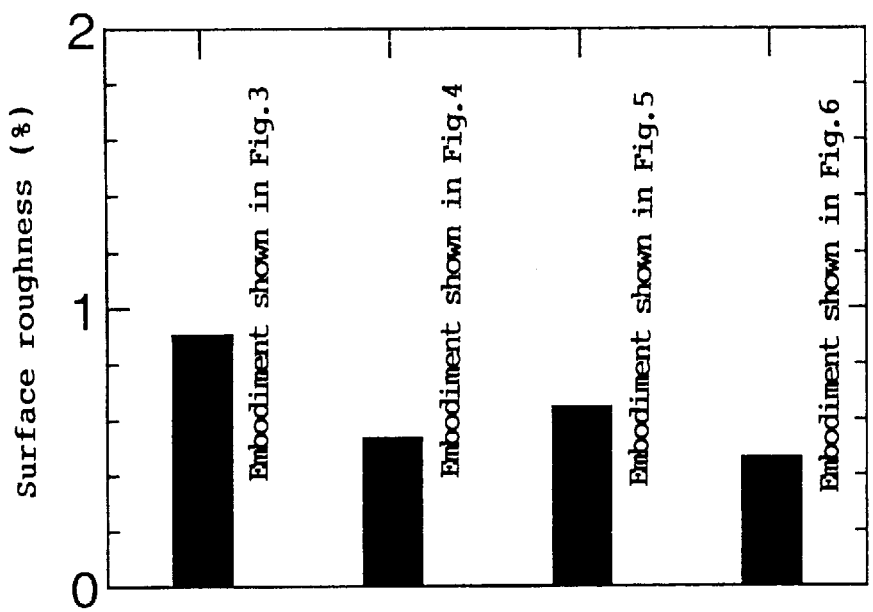

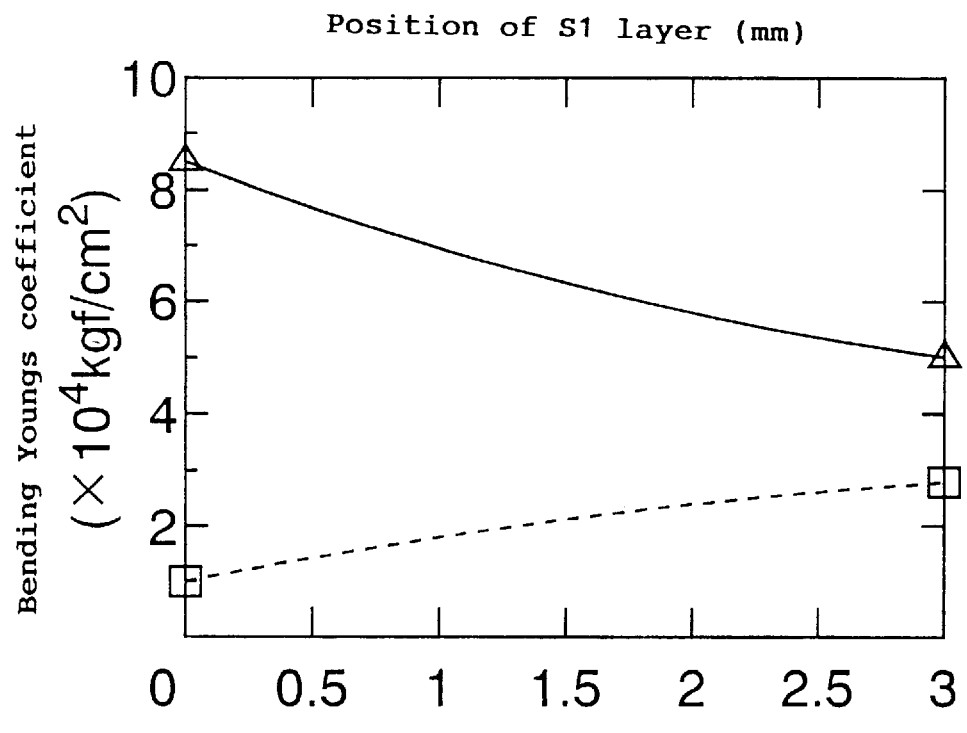
F I G. 16

MANUFACTURING METHOD FOR A WOOD COMPOSITE LAYERED MATERIAL

This application is a divisional of commonly assigned, copending U.S. patent application Ser. No. 08/753,897 filed Dec. 2, 1996.

BACKGROUND OF THE INVENTION

The present invention relates to an apparatus and method for providing a multi-layered lumber product which effectively utilizes a relatively low quality material such as small-diameter wood, old wood, pieces of wood which are byproducts of lumbering, and bamboo. Heretofore, such relatively low qualities materials have not been effectively utilized.

For a long time now, materials belonging to a wood group have been formed into lumbered products by cutting raw wood. Conventionally, lumbered products are formed into a plate material for use in floors, walls, roofs and the like. A desirable minimum size of such a plate for use in houses and other buildings or structural objects may be, for example, 1800 mm in length by 900 mm in breadth. However, since a plate material having such a size can be made only by a raw wood material having a diameter of more than 900 mm, the yield from the raw wood is very low. Thus, presently, production of such plates from raw wood is prohibitively expensive due to lack of a sufficient quantity of raw wood, production costs, and the like.

Materials which have been used heretofore to supplement lumbered products include plywood, particle board, and fiberboard. Plywood is a multi-layered material with a number of adhered veneer which does not require a cutting process by a saw as with the usual lumbering process, and can provide a yield from the raw wood of 60–70%. However, since the veneer is made by using a rotating cutter to peel thin layers from the raw wood, the material which can be used is limited to raw wood having a large diameter.

With particle board or fiberboard, which comprise layers of pressed and molded wood particles obtained by cutting the wood, since the composing element is small, the yield from raw wood can be as high as 80–90%. Additionally, small-diameter wood, waste material from plant or house construction, and broken wood can be used as a raw material, but strength and stiffness are decreased relative to plywood. Generally, particle board includes any of various composition boards which are formed from small particles of wood, such as flakes or shavings, which are bonded together with a resin. Fiberboard is a building material made of wood or other plant fibers which are compressed and cemented into rigid sheets.

As it is known, since wood materials and bamboo have many advantages, including high-quality and beauty, and ease of obtaining, processing and reproducing, they have been widely used for many years. However, in concomitance with an increasing world population and human life spans, the quantity of wood material used has been remarkably increased, and the requirement for additional wood materials for various uses has increased.

To this end, as described above, new wood group materials such as plywood, particle board, fiberboard and the like have been developed, in particular, for use in constructing plate-like boards for flooring, siding, roofing and other applications.

However, with plywood, particle board, and fiberboard, effective utilization of forest resources is still limited. In particular, plywood must be fashioned from raw wood having a large diameter, and, even though particle board and fiberboard can utilize 80–90% of raw wood, they do not possess the necessary properties for a structural plate material which is used in houses, other buildings, and structural objects, such as furniture and the like.

Nowadays, as forest resources are increasingly depleted and resulting environment conditions are deteriorated due to the use of wood as a material for furniture, building materials, and structural materials, there is an urgent need for the development of an improved technique for making plate materials which have the required properties for use in houses, other building and structural objects, and wherein the production of waste parts is minimized, regardless of how large or small the standing wood or raw wood is.

Furthermore, since the above-described conventional plate materials do not possess good shock- and vibration-absorbing properties, there has been a problem in providing floor materials for use in stairways of multiple floor buildings, or in flooring for areas with high pedestrian traffic, or in other floor applications.

Accordingly, it would be desirable to provide a building material which efficiently utilizes raw wood materials while also providing good properties, including high strength, and good shock and vibration absorption. The present invention provides a method and apparatus having the above and other advantages.

SUMMARY OF THE INVENTION

In accordance with the present invention, a novel wood group building material which solves the above-described conventional problems is presented. The composite piled (e.g., multi-layered) material in accordance with the present invention is made by combining a structural layer and a shock/vibration-absorbing layer. The structural layer uses a plurality of finely split pieces formed by splitting a fibrous raw material such as wood or bamboo in the fiber direction. The shock/vibration-absorbing layer uses small pieces of raw material such as wood and bamboo which are not necessarily aligned along a fiber direction.

Further, although a small-diameter log of Japanese cedar was used as a raw wood in example embodiments herein, it is possible to use a low quality wood of bamboo, willow and the like, broken branches, pieces of wood which are byproducts of the lumbering of raw wood, and waste wood from demolished buildings or the like. Moreover, the above low quality woods can be used independently or mixed together.

A composite multi-layered building material of the present invention comprises at least one structural layer and at least one shock/vibration absorbing layer. The structural layer comprises a number of elongated pieces or strands of a fibrous raw material which are arranged substantially parallel to one another. The pieces are adhered to one another by an adhesive agent. Moreover, one or more of the structural layers and the shock/vibration-absorbing layers are arranged in a plurality of layers in an alternating manner to form a multi-layered structure. The multi-layered structure is pressed to a predetermined thickness thereby causing the layers to adhere to one another to provide the multi-layered material as a unitary, substantially rigid body which is suitable for building. The multi-layered structure may be heated to a temperature of approximately 180° C. while being pressed to cause the layers to adhere to one another.

Additionally, the shock/vibration-absorbing layer may comprise at least one of particle board and fiberboard. The shock/vibration-absorbing layer may also comprise a denatured petroleum resin including at least one of polyvinyl chloride, polyurethane, polyvinyl acetate, acrylic resin, natural gum, butadiene-styrene rubber, nitrile rubber, and chloroprene-copolymer, or a mixture of any of these resins. Moreover, the resin may be formed to a pellet shape which is a load-bearing element.

The multi-layered material may comprise the structural layers (S1) and the vibration/shock-absorbing layers (P) in the sequence S1:P:S1, or alternatively, P:S1:P.

Moreover, the multi-layered material may comprise at least first and second structural layers; where the plurality of elongated pieces of the first structural layer are arranged substantially orthogonal to the plurality of elongated pieces of the second structural layer. In one embodiment, the weight of the structural layers is equal to the weight of the shock/vibration-absorbing layers.

Corresponding methods are also provided.

As explained above, in accordance with the present invention, small-diameter and low quality woods such as broken branches, pieces of wood which are byproducts of the lumbering process, waste wood from demolished buildings and the like which have previously not been utilized can now be utilized without waste. Accordingly, the yield of the raw material is very high, and an effective utilization rate of forest resources can be greatly increased.

Furthermore, by changing the number of layers of the arrangement of structural layers and shock/vibration-absorbing layers, a product having a tailored strength, stiffness, hardness, softness, and/or other qualities can be easily provided which has not been available in conventional wood materials. Thus, a novel wood group material having properties which conform to the intended application can be easily provided.

Further, a wood material having excellent shock and vibration-absorbing properties which have not been available in conventional wood materials can be realized. Accordingly, by using the composite multi-layered material of the present invention in a house or other building, floor, structural object, roof, wall, or the like, improved properties which could not been obtained in conventional wood materials can be realized at a very low cost.

BRIEF DESCRIPTION OF THE DRAWINGS

FIG. 10 is a graph comparing a surface roughness of each composite multi-layered plate shown in FIGS. 3–6.

FIG. 16 is a graph illustrating a change of Young's coefficient when the total weight of the structural layer and shock/vibration-absorbing layers are equal, and the arrangement of the layers is varied.

DETAILED DESCRIPTION OF THE INVENTION

A method and apparatus are presented for a composite multi-layered building material having good properties which efficiently utilizes wood resources.

Figure 1A:
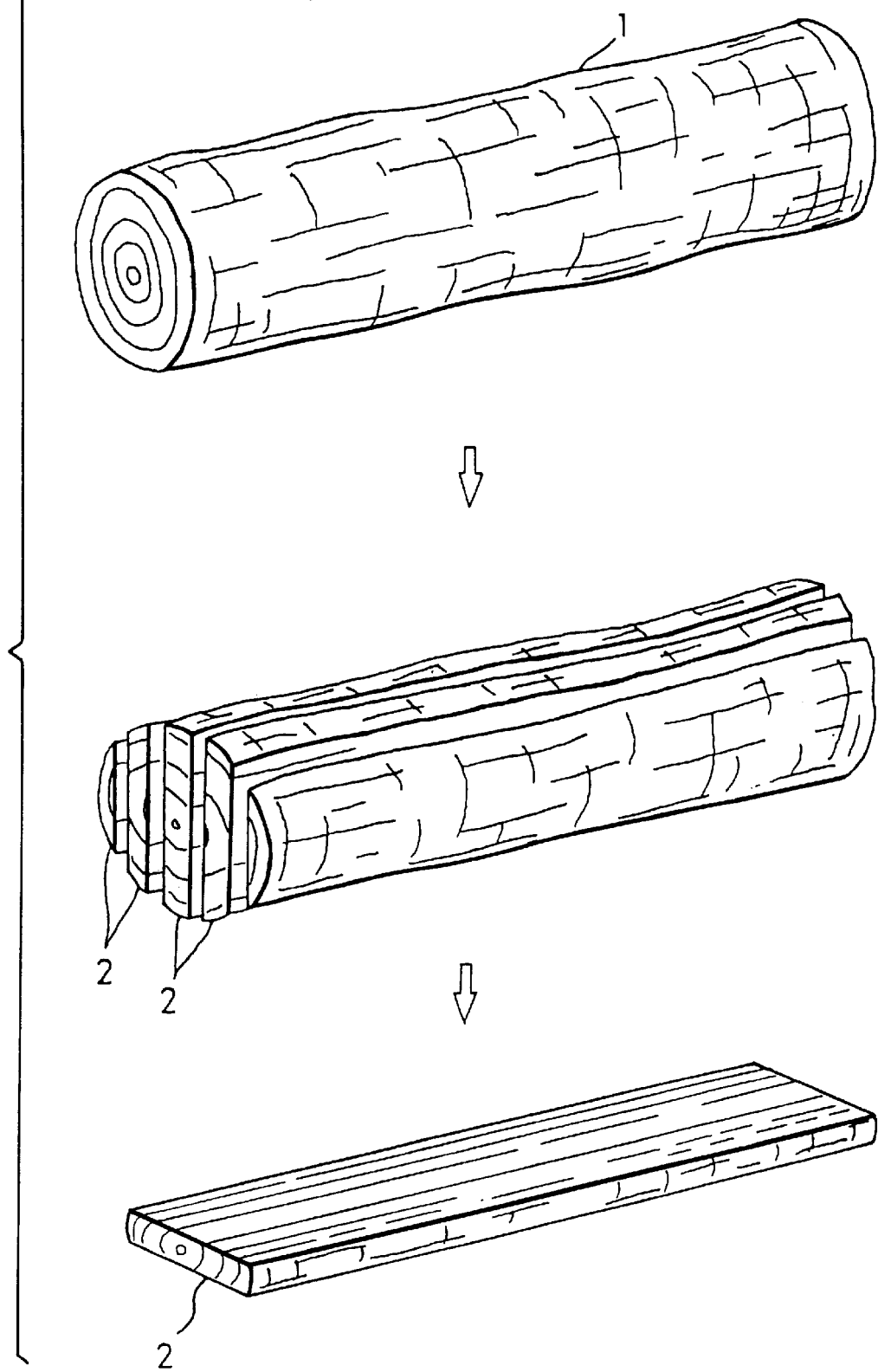
FIGS. 1(a) and (b) are perspective views illustrating the manufacturing process of finely split pieces in accordance with the present invention.

FIGS. 1(a) and (b) are perspective views illustrating the manufacturing process of finely split pieces in accordance with the present invention. Firstly, as shown in FIG. 1(a), for a finely split piece to be used in a structural layer, a predetermined size material 2 is obtained by cutting raw wood 1, for example, a small-diameter log such as a Japanese cedar with a length of 400 mm. The raw wood 1 may be cut a plurality of times to provide the plate material 2, which may have a thickness of 25 mm. Note that all dimension given herein are examples only, and the invention may be adapted to various sizes and shapes of raw wood and finished product.

Figure 1B:
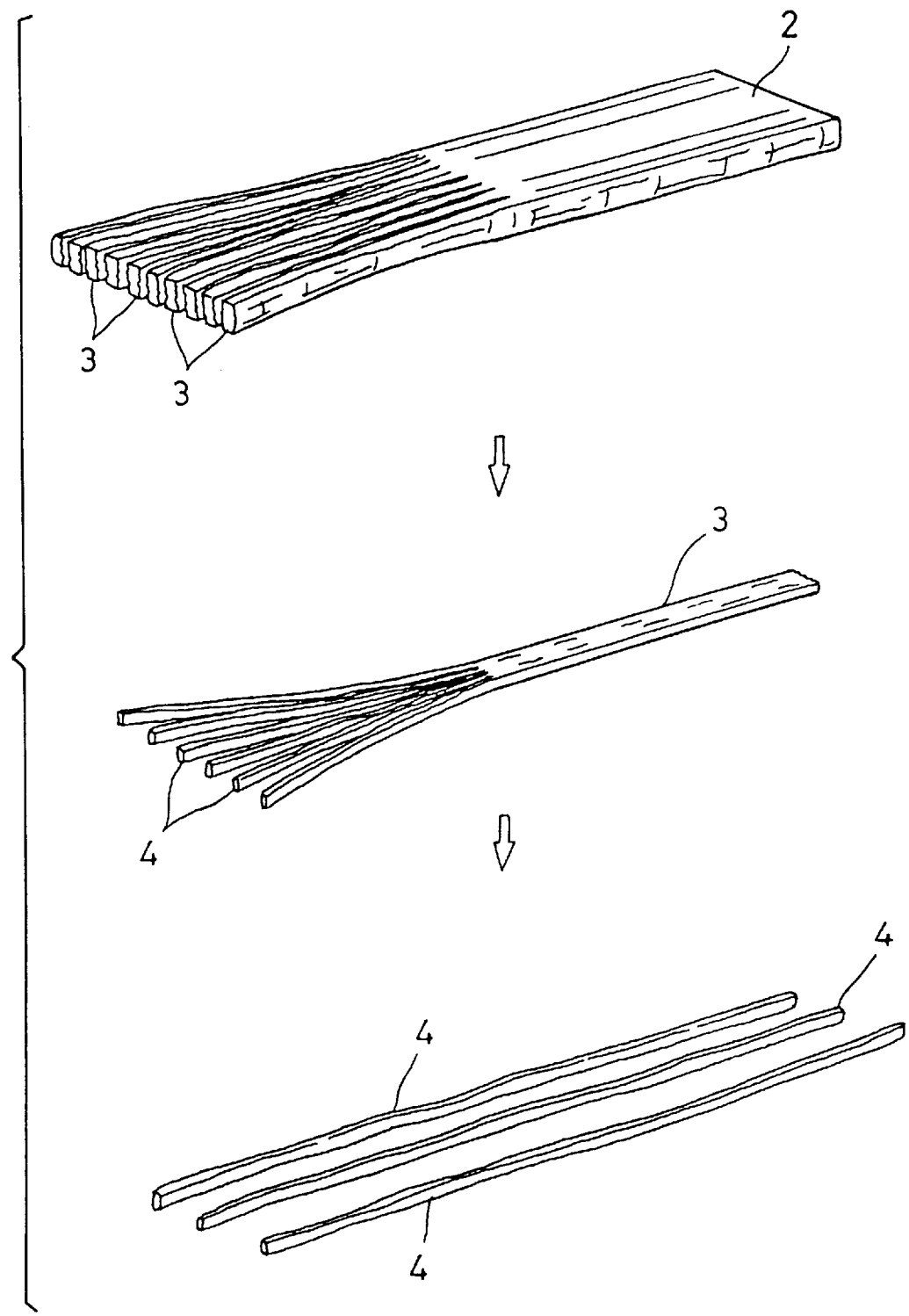

As shown in FIG. 1(b), the predetermined size material 2 is split again in the fiber direction (e.g., along the grain) to produce a split material 3 with a 10 mm thickness. The split material 3 is further finely split along the fiber direction to form finely split pieces having a cross section, for example, of 4×10 mm. For the splitting of the raw wood 1, a splitting device according to Japanese patent application Hei-5-352271 may be used. Also of interest are Japanese laid-open patent Hei-7-195313, U.S. Pat. No. 5,441,787, and U.S. Pat. No. 5,505,238, all of which are assigned to the assignee herein.

Figure 2A:
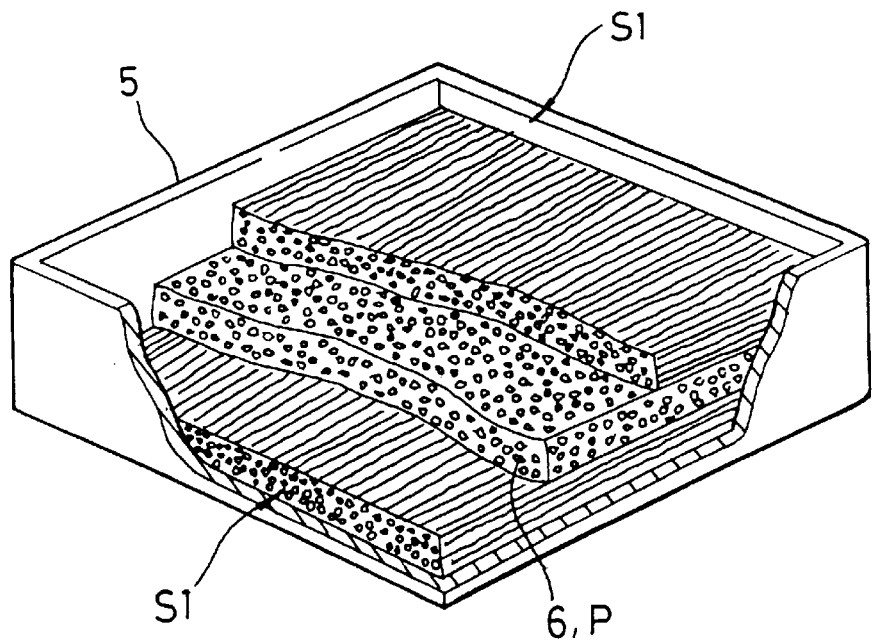
FIG. 2(a) is a perspective view illustrating a molding frame for obtaining a composite multi-layered material including two structural layers and one shock/vibration-absorbing layer in accordance with the present invention.

FIG. 2(a) is a perspective view illustrating a molding frame for obtaining a composite multi-layered material including two structural layers and one shock/vibration-absorbing layer in accordance with the present invention. Small pieces 6 of a wood group material are used to provide a shock/vibration-absorbing layer. The small pieces 6 are made by the same process which is used for manufacturing of conventional particle board or the like. The finely split pieces 4 obtained from the above-described process and small pieces 6 of the wood group material are separately dried (i.e., before layering), and a phenol resin adhesive agent is sprayed separately within a rotary drum. The adhesive agent comprises approximately 10% of the weight of each of the finely split pieces 4 and small pieces 6. Successively, a plurality of finely split pieces receive the adhesive agent and are arranged within a molding frame 5, which may be 400×400 mm. The finely split pieces 4 are arranged in a lengthwise (e.g., fiber) direction to form a structural layer S1, and small pieces 6 are multi-layered on it so as to form a shock/vibration-absorbing layer P.

Figure 2B:
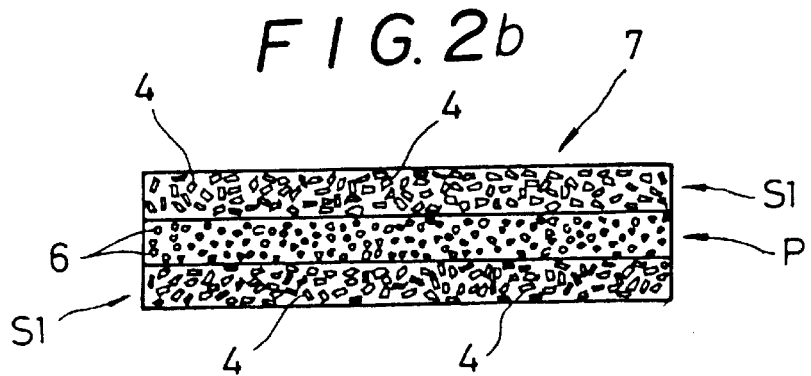
FIG. 2(b) is a cross-sectional view illustrating a composite multi-layered material including two structural layers and one shock/vibration-absorbing layer in accordance with the present invention.

FIG. 2(b) is a cross-sectional view illustrating a composite multi-layered material including two structural layers and one shock/vibration-absorbing layer in accordance with the present invention. The arranging of a number of structural and shock/vibration-absorbing layers may be repeated in turn, for example, to form a multi-layered body 7 which has alternating structural layer S1 and a shock/vibration-absorbing layer P.

Furthermore, although a lowermost layer is formed as a structural layer 1 at above, it is possible even when this is changed by the shock/vibration-absorbing layer P, and a uppermost layer is also formed by the shock/vibration-absorbing layer P.

And, although the weight of the finely split pieces 4 and the small pieces 6 of each aforementioned layer may be approximately equal, this is not required. That is, for each layer, the weights of the finely split pieces 4 and the small pieces 6 used for each layer need not be equal. Additionally, an overall desired ratio of weight to number of layers may be constant or varied.

Further, it is possible to provide an orthogonal arrangement of the finely split pieces 4 of the structural layers S1, or of the small pieces 6 of the shock/vibration-absorbing layer P, where each of the finely split pieces is considered to have some defined lengthwise dimension. For example, the finely split pieces 4 of the bottom structural layer may be substantially orthogonal to the finely split pieces 4 of the top structural layer. Within a single layer, the finely split pieces are substantially parallel. Alternatively, the finely split pieces 4 of the bottom structural layer may be substantially parallel to the finely split pieces 4 of the top structural layer. Moreover, these configurations can be extended to any number of layers.

And, when a vibration-absorbing material is spread and mixed without adding the small pieces 6 to the shock/vibration-absorbing layer P, a capacity of the shock/vibration-absorbing layer P can be increased. For example, a vibration-absorbing material selecting from the group of polyvinyl chloride, polyurethane, polyvinyl acetate, acrylic resin, natural gum, butadiene-styrene rubber, nitrile rubber, chloroprenecopolymer, or other denatured petroleum resin may be used. And, a mixture or combination of the aforementioned substances may be used. Furthermore, although the vibration-absorbing material is shown herein as comprising pellet-shaped small pieces, it is possible to use other shapes, such as a particle-shape, needle-shape, wafer-shape, strand-shape, or sheet-shape.

Figure 2C:
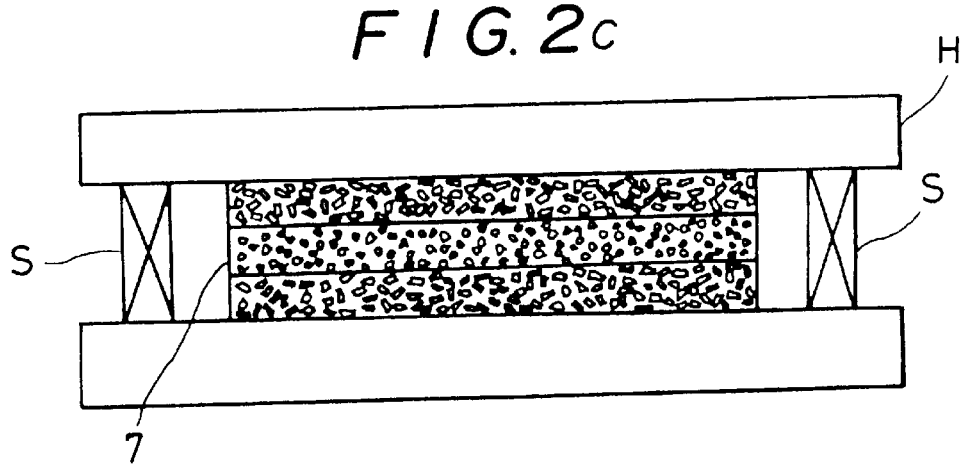
FIG. 2(c) is a cross-sectional view illustrating the heat-pressing of a composite multi-layered material including two structural layers and one shock/vibration-absorbing layer in accordance with the present invention.

FIG. 2(c) is a cross-sectional view illustrating the heat-pressing of a composite multi-layered material including two structural layers and one shock/vibration-absorbing layer in accordance with the present invention. The multi-layered body 7 obtained with the aforementioned process is pressed and tightened at a press which includes a spacer S and a hot press H. The press exerts a pressure of, for example, 30 to 45 kilograms force per square centimeter (kgf/cm$^2$), at a temperature of, for instance, 180° C. for 10 to 15 minutes. After the pressure is released, the composite multi-layered material 8 described in FIGS. 3–6 is obtained.

Hereinafter, the preferred embodiments of the present invention will be described in further detail with reference to FIGS. 3–6. In each embodiment, the composite multi-layered material 8 is manufactured under the following conditions:

Elementary materials (1) Finely split pieces—Japanese cedar strand (about 400 mm in length, 10 mm in width, 3–4 mm in thickness).

(2) Small pieces—Japanese cedar particle (20 mm in length, 4 mm in width, 0.5 mm in thickness).

(3) Adhesive agent—phenol resin.

(4) Condition of thermal pressure molding—180° C. thermal plate temperature, 45 kgf/cm$^2$ of pressing and tightening force, 15 minutes of thermal pressing time.

Furthermore, the shape of the composite multi-layered material 8 obtained with each embodiment is approximately 40 cm in length by 40 cm breadth, 12 mm in thickness, with a specific weight of 0.7. And, the composition of the finely split pieces 4 and the small pieces 6 is made to a 1:1 weight ratio, and various composite multi-layered materials 8 were obtained by changing the layering structure.

Figure 3:
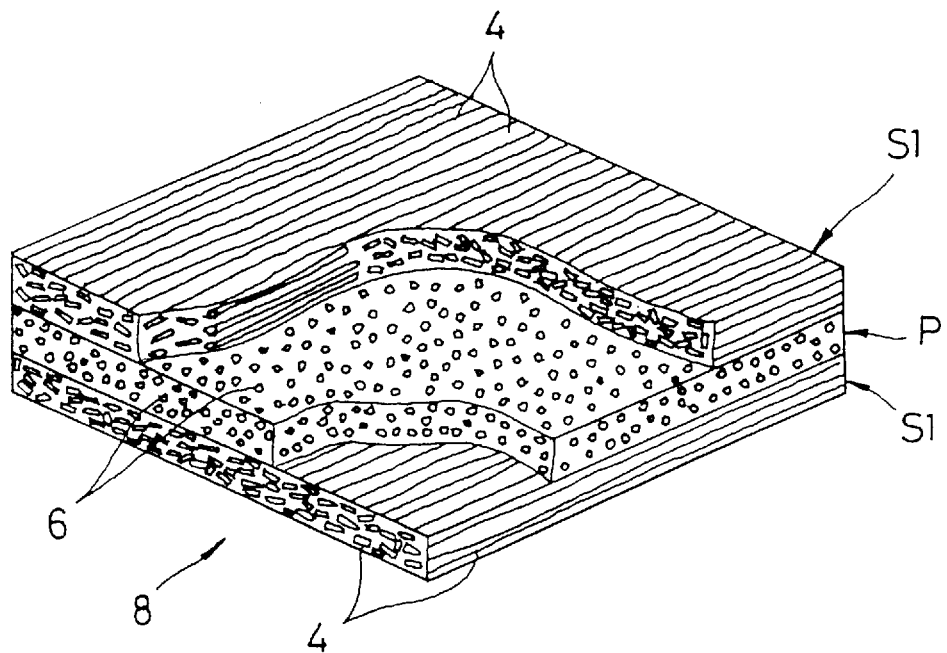
FIG. 3 is a perspective, partial cutaway view of a first embodiment of a composite multi-layered material having three layers in accordance with the present invention.

FIG. 3 is a perspective, partial cutaway view of a first embodiment of a composite multi-layered material 8 having three layers in accordance with the present invention. The multi-layered material 8 has a three-layer structure including a structural layer S1, a shock/vibration-absorbing layer P, and a structural layer S1. The elementary materials used in this embodiment are as above, and the weights of the finely split pieces, small pieces and adhesive agent are as follows. Namely, since the shape of the composite multi-layered material 8 is 40 cm×40 cm in length by breadth, and 12 mm in thickness, and its specific weight is set to 0.7, its total weight is 40×40×1.2×0.7=1,344 g.

Among them, since 10% of the weight of the finely split pieces 4 and the small pieces 6 is used for the adhesive agent, its weight is 1,344/(10+1)=1,344/11=122.18 g. Accordingly, the weight of the finely split pieces and the small pieces is 1344−122.18=1,221.8 g. Since the weight ratio of the finely split pieces and the small pieces is 1:1, each weighs 1,221.8/2=610.9 g.

Next, a manufacturing process will be described. Firstly, one-half of the amount of adhesive agent of the above-described weight is spread to the finely split pieces (weighing 610.9 g) and stirred. The remaining adhesive agent is spread to the small pieces (weighing 610.9 g) and stirred. The finely split pieces and the small pieces which spread the adhesive agent thus are multi-layered within a molding frame 5 as shown in FIG. 2. Next, the finely split pieces 4 (weighing 610.9/2 g) are respectively arranged lengthwise to form the structural layer S1 as the bottom layer. The small pieces (weighing 610.9 g) are stacked to form the shock/vibration layer P as the middle layer, and a structural layer S1 is formed again thereon as a top layer so that the lengthwise direction (e.g., fiber direction) of each of the finely split pieces 4 in the top layer is made to be same direction as the lengthwise direction of each of the finely split pieces 4 of the bottom layer.

Each layer is successively heat-pressed and tightened by the hot press H as shown in FIG. 2(*c*). Further, during pressing by the hot press, a thickness of the stacked body 7 is defined to be 12 mm by using a spacer S which has a height of 12 mm. After the heat-press tightening is finished, the stacked body 7 is preserved, whereby a composite multi-layered body 8 as a finished product is obtained.

Figure 4:
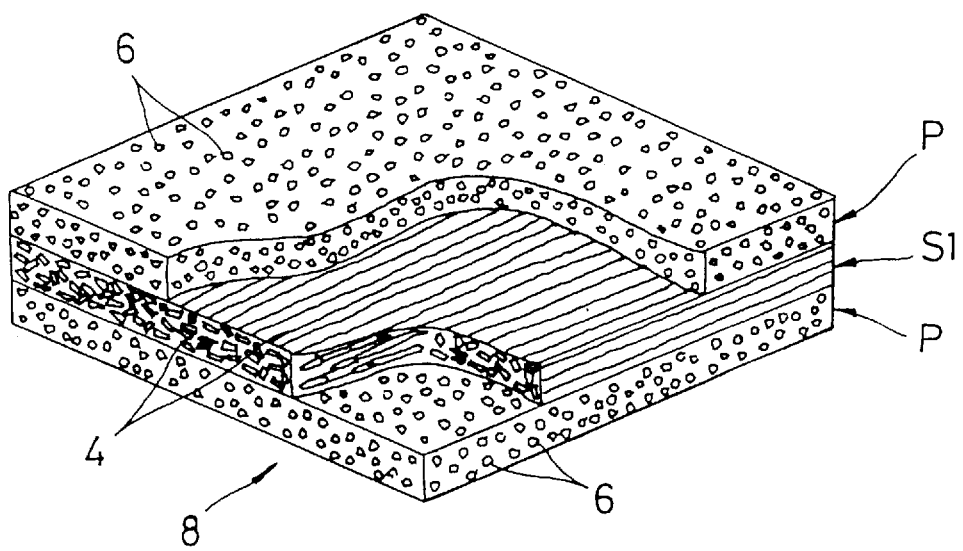
FIG. 4 is a perspective, partial cutaway view of a second embodiment of a composite multi-layered material having three layers in accordance with the present invention.

FIG. 4 is a perspective, partial cutaway view of a second embodiment of a composite multi-layered material having three layers in accordance with the present invention. Here, the multi-layered material 8 has two shock/vibration-absorbing layers P as bottom and top layers, and one structural layer S1 as a middle layer. The small pieces (weighing 610.9/2 g in each layer) are formed in the stacked shock/vibration-absorbing layers P, with each of the finely split pieces (weighing 610.9 g) being arranged in parallel to each other within a layer. Thus, the composite multi-layered material 8 of 40×40 cm in length by breadth, 12 mm in thickness, and 0.7 in specific weight is obtained.

Figure 5:
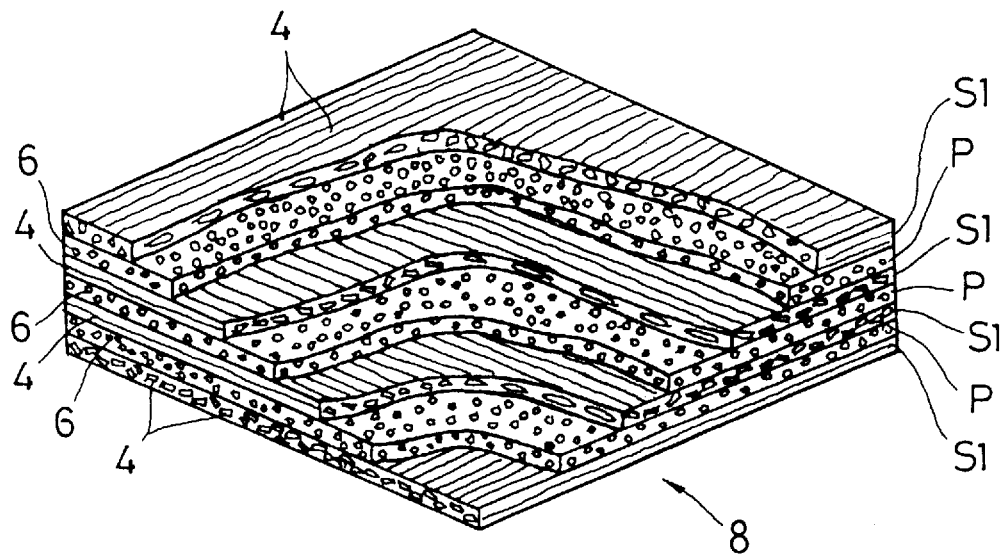
FIG. 5 is a perspective, partial cutaway view of a third embodiment of a composite multi-layered material having seven layers in accordance with the present invention.

FIG. 5 is a perspective, partial cutaway view of a third embodiment of a composite multi-layered material having seven layers in accordance with the present invention. The composite multi-layered material 8 has a seven layer structure where both the top and bottom layers are structural layers S1. Moreover, there are a total of four structural layers which are arranged alternately with three shock/vibration-absorbing layers. A plurality of finely split pieces (weighing 610.9/4 g in each structural layer S1) are respectively arranged in parallel to each other in a lengthwise direction (e.g., fiber direction) to form each structural layer S1. Each shock/vibration-absorbing layer P includes stacks of the small pieces 6 (weighing 610.9/3 g in each layer P).

The finely split pieces 4 in each structural layer S1 may be arranged so that the lengthwise direction of each finely split pieces 4 within each layer S1 is substantially orthogonal to the finely split pieces 4 of another structural layer S1. For example, the pieces 4 of the lowermost structural layer are orthogonal to the pieces of the second lowermost structural layer, while the pieces 4 of the uppermost structural layer are orthogonal to the pieces of the second uppermost structural layer. However, the pieces of the second lowermost structural layer are parallel to the pieces of the second uppermost structural layer.

Alternatively, the pieces 4 of the two uppermost structural layers may be re-oriented by ninety degrees, for example, so that alternating structural layers have orthogonal pieces 4. Other combinations will become apparent to those skilled in the art. Generally, as discussed in further detail below, various properties of the material 8 will depend upon the orientation of the finely split pieces 4 of the respective structural layers S1. Accordingly, the orientation of the finely split pieces 4 can be adapted to achieved a desired characteristic of the material 8.

With the above arrangements, a plate shaped composite multi-layered material 8 of 40 cm×40 cm in length by breadth, 12 mm in thickness, and 0.7 in specific weight is obtained.

Figure 6:
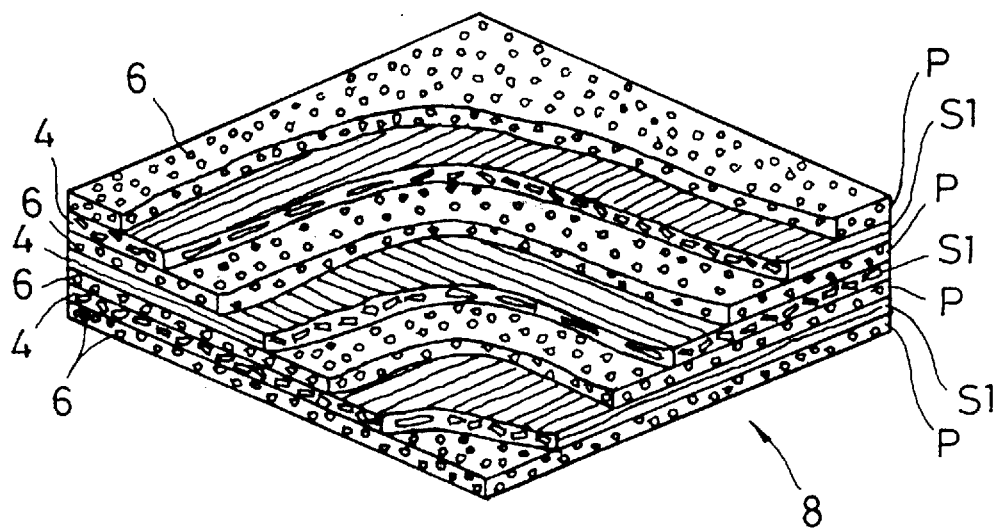
FIG. 6 is a perspective, partial cutaway view of a fourth embodiment of a composite multi-layered material having seven layers in accordance with the present invention.

FIG. 6 is a perspective, partial cutaway view of a fourth embodiment of a composite multi-layered material having seven layers in accordance with the present invention. Here, the composite multi-layered material 8 again has a seven layer structure, but there are four shock/vibration-absorbing layers P and three structural layers S1. Moreover, the lowermost and uppermost layers are shock/vibration-absorbing layers P. In this embodiment, since there are three structural layers, the weight of the finely split pieces used for each layer is 610.9/3 g.

On the other hand, since there are four shock/vibration-absorbing layers P, the weight of the small pieces of each layer P is 610.9/4 g. Firstly, a lowermost shock/vibration-absorbing layer P with the small pieces 6 is formed, and then a plurality of finely split pieces 4 are arranged in parallel to a lengthwise direction to form the lowermost structural layer S1. Then, a second lowermost shock/vibration-absorbing layer P is formed on the lowermost structural layer. Further, a middle structural layer S1 of finely split pieces is formed on the second lowermost shock/vibration-absorbing layer so that the lengthwise direction of the finely split pieces 4 of the middle layer S1 are orthogonal to the lengthwise direction of the finely split pieces 4 of the lowermost structural layer S1.

Successive shock/vibration-absorbing layers P and structural layers S1 are formed as shown. In particular, the pieces 4 of the uppermost structural layer are arranged to be orthogonal to the pieces 4 of the middle structural layer. A second uppermost shock/vibration-absorbing layer P is formed between the middle and uppermost structural layers, and an uppermost shock/vibration-absorbing layer is formed as a top layer to finally obtain the plate shaped composite multi-layered material 8 which is 40 cm×40 cm in length by breadth, 12 mm in thickness, and which has a specific weight of 0.7.

In order to verify the capacity of the composite multi-layered material 8 in accordance with each of the aforementioned embodiments, measurements of bending strength, peeling off strength, and surface roughness were performed.

Figure 7:
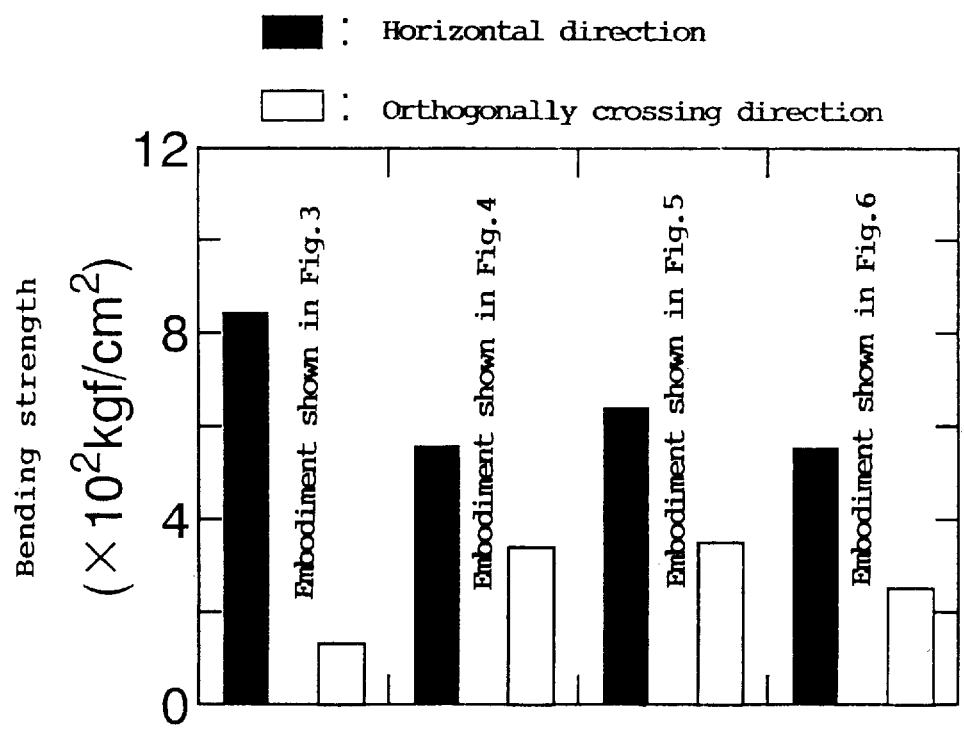
FIG. 7 is a graph comparing the bending strength of each composite multi-layered plate shown in FIGS. 3–6.

FIG. 7 is a graph comparing the bending strength of each composite multi-layered plate shown in FIGS. 3–6. From this test result, it will be understood that when the layering structure is changed, the bending strength will also change. Accordingly, it is possible to tailor the layering structure to the requirements of different applications. For the bending strength in the parallel direction (e.g., the lengthwise direction of outermost layer of finely split pieces), the embodiment shown in FIG. 3 is strongest. In fact, the bending strength is about 3.2 times that of conventional structural plywood. Additionally, the embodiment shown in FIG. 5 has a bending strength which is about 2.5 times that of structural plywood, while the embodiments shown in FIG. 4 and 6 have similar bending strengths which are approximately 2.2 times that of structural plywood.

The bending strength in the orthogonal direction (e.g., the direction which orthogonally crosses the lengthwise direction of the outermost layer of finely split pieces) is similar for the embodiments of FIGS. 4 and 5 at about 1.7 times that of structural plywood. The embodiments of FIGS. 3 and 6 show bending strengths which approximate that of structural plywood. It will be understood that, with a three-layer structure, an isotropic characteristic (e.g., a characteristic differing in capacity by direction) is large, but with a seven layer structure, the isotropic characteristic is small.

Figure 8:
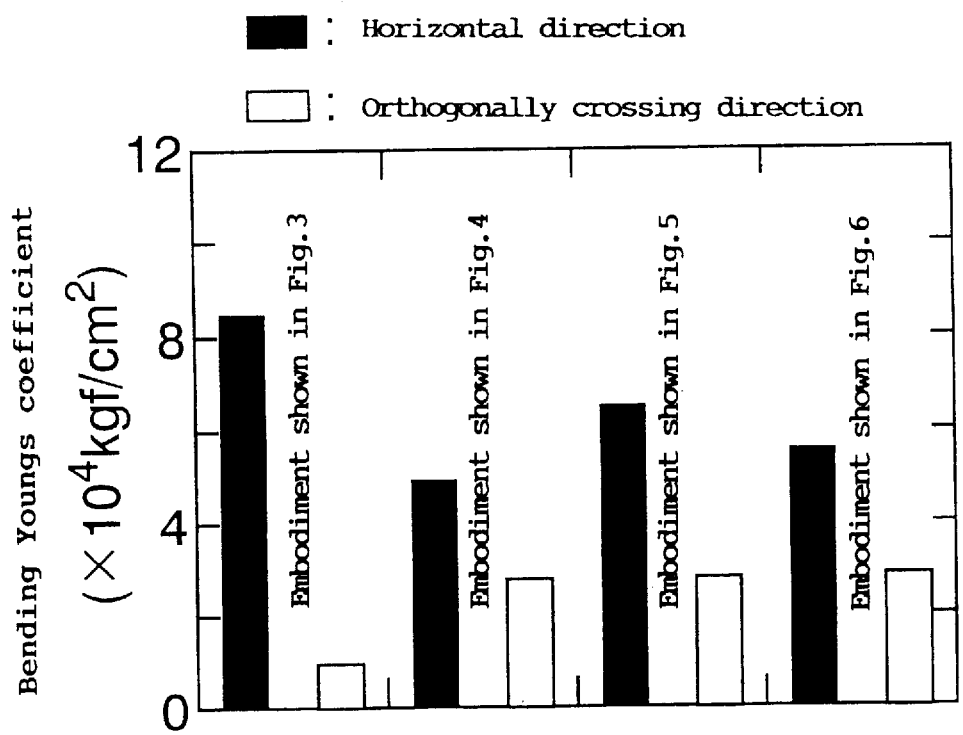
FIG. 8 is a graph comparing the bending Young's coefficient of each composite multi-layered plate shown in FIGS. 3–6.

FIG. 8 is a graph comparing the bending Young's coefficient of each composite multi-layered plate shown in FIGS. 3–6. Young's coefficient (e.g., modulus), is the ratio of tensile stress to tensile strain in a solid body which undergoes elastic deformation. Furthermore, the tensile stress is the ratio of the deforming force to a cross-sectional area, while the tensile strain is the ratio of a change in length to the original length of the deformed solid.

For the bending Young's coefficient in the horizontal (e.g., parallel) direction, the embodiment of FIG. 3 is highest, with a value which is 1.5 times that of structural plywood. The embodiment of FIG. 5 shows an improvement factor of 1.2.

The embodiments of FIGS. 2 and 4 have bending coefficients which approximate that of structural plywood. In the orthogonally crossing direction, the bending coefficient for the embodiments of FIGS. 4–6 approximate that of structural plywood.

Figure 9:
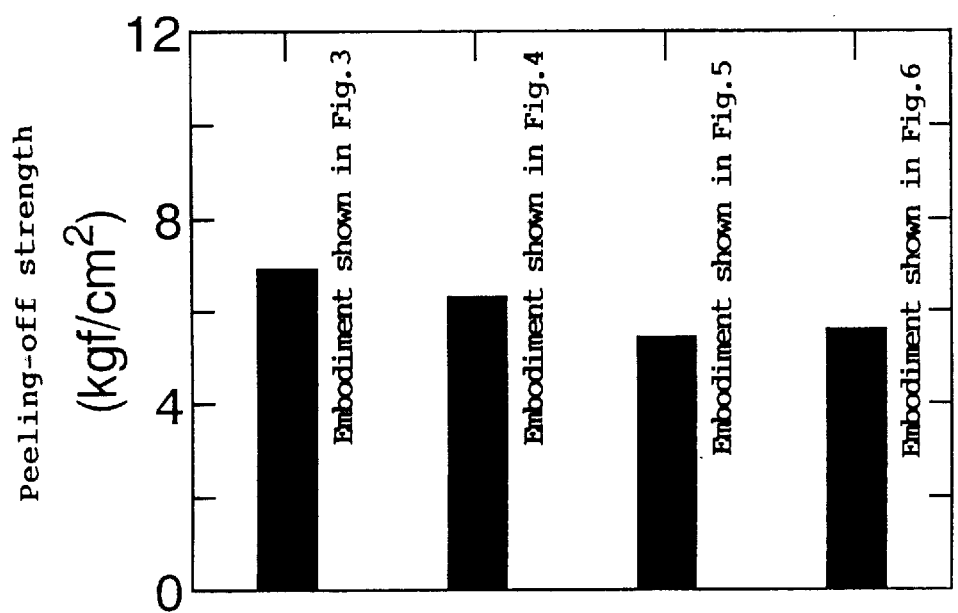
FIG. 9 is a graph comparing the peeling-off strength of each composite multi-layered plate shown in FIGS. 3–6.

FIG. 9 is a graph comparing the peeling-off strength of each composite multi-layered plate shown in FIGS. 3–6. The peeling off strength is approximately constant regardless of the layering structure, and it about twice that of particle board.

FIG. 10 is a graph comparing a surface roughness of each composite multi-layered plate shown in FIGS. 3–6. The roughness is defined by calculating a mean value of thickness which is measured at ten places, and dividing by a standard deviation (e.g., variation coefficient). The embodiment of FIG. 3 has the highest surface roughness, while the embodiments of FIGS. 4–6 are approximately 60%, 70% and 50%, respectively, of the value of the FIG. 3 embodiment.

From above test results, the following conclusion can be made for the composite multi-layered plate material of the present invention:

(a) Young's bending coefficient, bending strength, and peeling off strength show remarkable improvements over conventional plywood, particle board, and fiber plate;

(b) By changing the layering structure, a strength of a particular direction is increased, or an isotropic property is decreased. Thus, specific material design capacities can be achieved; and (c) By using a layer formed by small pieces of wood and the like at the outer surfaces, an improved surface property is possible.

These facts show that the composite multi-layered plate in accordance with the present invention is a most suitable novel material for use as a structural member for buildings and other structures requiring high quality and capacity structural members.

Note that, although the composite multi-layered material of plate shape in accordance with the above-described embodiments had a specific weight of 0.7, this value means that the mean specific weight calculated from the size and weight of the composite multi-layered material is 0.7, and it does not necessarily mean that every part alike has a specific weight of 0.7.

The composite multi-layered material in accordance with the present invention forms layers using two kinds of elements which are remarkably different in shape (e.g., finely split pieces of the structural layer S1 versus the small pieces of the shock/vibration layer P). Accordingly, the properties of each layer will vary, and the properties of a given layer can also vary depending on factors such as the thickness and orientation of the layer. Moreover, the properties of the resulting multi-layered material will vary according to the characteristics of the constituent layers.

For example, the shock/vibration-absorbing layer P can more easily receive a pressure, and is selectively and strongly compressed. And, the thickness of the various structural layers S1 may vary depending on the position of the layer within the multi-layered composite. Thus, it may be difficult to theoretically calculate the specific weight.

Further, according to practical observations of the three-layer structure, the ratio of thickness of each layer and the weight ratio may be approximately identical. That is, the weight ratio of each layer, including the adhesive agent, is 336 g:672 g:336 g=1:2:1, and the thickness ratio is 3 mm:6 mm:3 mm=1:2:1. However, for the seven layer structure, the weight of each layer is relatively small, and, particularly, since the shock/vibration-absorbing layer is strongly compressed, it was difficult to set their thicknesses even when the cross section is observed. This may be due to the small pieces of the shock/vibration-absorbing layer (which is interposed between the structural layers) being compressed to a state wherein the small pieces fill gaps between the finely split pieces of the structural layers.

Besides, a goal of the present invention in providing a structure which alternately arranges the small pieces layers and the finely split pieces layers is to provide a finished product with a predetermined stiffness. That is, since the finely split pieces are relatively large and stiff elements, a sufficient adhesive force could not be obtained if adjacent layers both comprised the finely split pieces and the pieces were arranged orthogonally between the layers since the contact area would be too small. Thus, apart from the case where adjacent layers comprises finely split pieces arranged all in one direction, a finished product of predetermined stiffness could not be obtained with contiguous structural layers. In accordance with the present invention, when the small pieces of the shock/vibration layer are interposed between the finely split pieces of the structural layers while orthogonally crossing the fiber directions of each other, each layer obtains sufficient adherence to the adjacent layer.

The inventors have further performed a test to measure the anti-shock/vibration capacity of the composite multi-layered material obtained by structuring the shock/vibration-absorbing layer P as a mixed layer by adding a vibration-absorbing material to the wood material small pieces 6. In this test, vibration energy is applied to one end of the material to be tested, and a loss coefficient of the vibration energy at other end is measured. The loss coefficient of the vibration energy is an index of attenuation of vibration energy.

Further, in a corresponding embodiment, polyvinyl chloride is used as a vibration and energy absorbing material. Details of the structural elements are as follows.

Elementary materials (1) Finely split pieces: are molded to a pellet state (particle diameter of about 2 mm); finely split pieces—Japanese cedar strand (400 mm in length, 10 mm width, 3–4 mm in thickness); small pieces—Japanese cedar particle (20 mm in length, 4 mm in width, 0.5 mm in thickness); and, vibration-absorbing material—agricultural polyvinyl chloride waste material;

(2) Adhesive agent: phenol resin; and (3) Conditions of thermal pressure molding: thermal plate temperature—180° C.; press-tightening force 45 kgf/cm$^2$; and, thermal pressing time—15 minutes.

Further, the composite multi-layered plate used for the test had a specific weight of 0.7, and the shape was 40 cm×40 cm in length by breath, 12 mm in thickness, and 40 of the wood material small pieces weight was spread and mixed into the shock/vibration-absorbing layer of the vibration-absorbing material to form the mixed layer. Additionally, the layering structure, manufacturing method, adhesive agent amount, weight of the finely split pieces and small pieces and the like are the same as the embodiments described above in connection with FIGS. 3–6.

FIGS. 11 to 14 show graphs which illustrate the measurement loss coefficient of the composite multi-layered material using the mixed vibration/shock absorbing layer.

Figure 11:
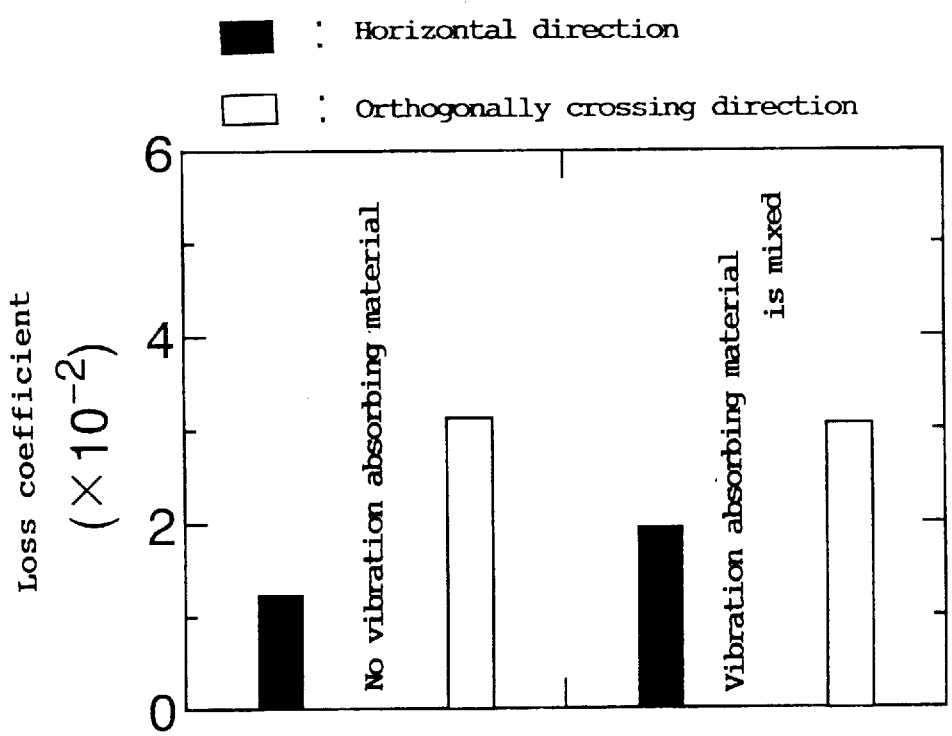
FIG. 11 is a graph comparing a loss coefficient of the composite multi-layered plate shown in FIG. 3 with and without a mixed vibration-absorbing layer.

FIG. 11 is a graph comparing a loss coefficient of the composite multi-layered plate shown in FIG. 3 with and without a mixed vibration-absorbing layer. The data indicated by the legend "No vibration-absorbing material" in FIGS. 11–14 represents the vibration/shock absorbing layer which uses only the wood material small pieces. It should be understood that the use of wood material small pieces alone still provides significant shock absorbing properties. The mixed vibration-absorbing material improves the loss coefficient in the horizontal (e.g., parallel) direction by a factor of 1.7 compared to the unmixed layer. However, in the orthogonal direction, the loss coefficient is substantially unchanged.

Figure 12:
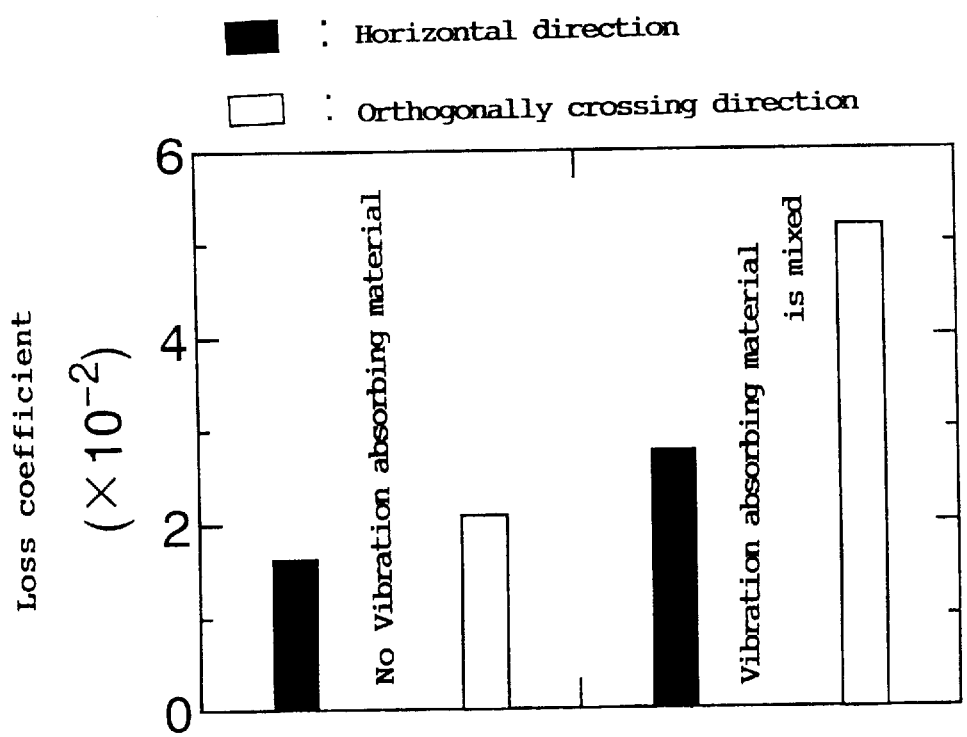
FIG. 12 is a graph comparing a loss coefficient of the composite multi-layered plate shown in FIG. 4 with and without a mixed vibration-absorbing layer.

FIG. 12 is a graph comparing a loss coefficient of the composite multi-layered plate shown in FIG. 4 with and without a mixed vibration-absorbing layer. Here, the mixed vibration-absorbing material improves the loss coefficient in the horizontal direction by a factor of about 1.8 compared to the unmixed layer, while the improvement in the orthogonal direction is by a factor of about 2.5.

Figure 13:
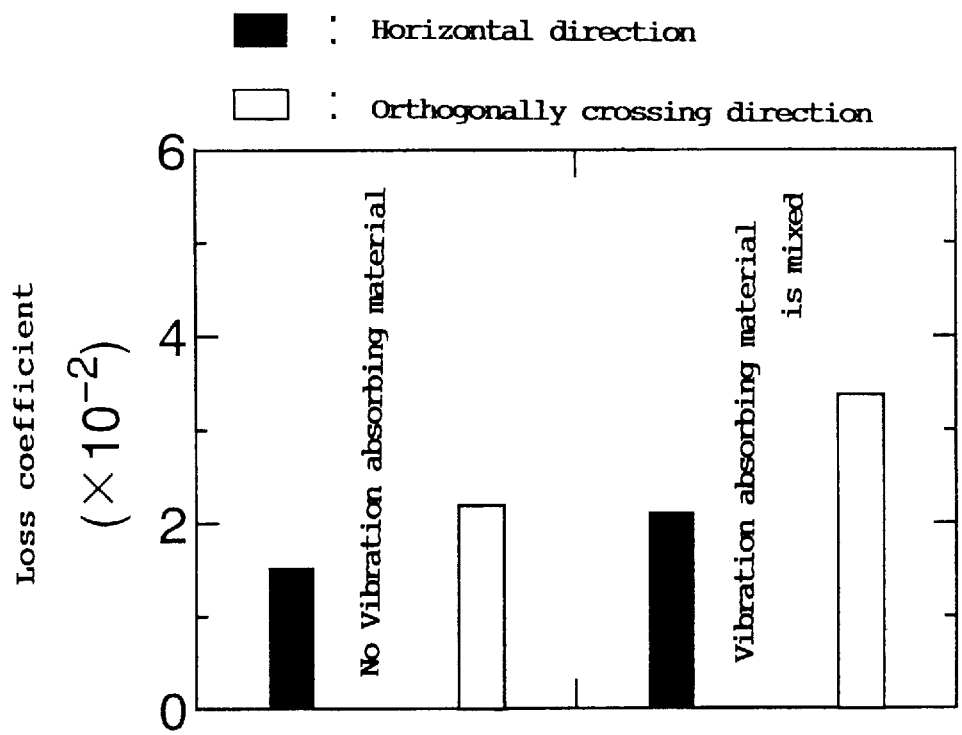
FIG. 13 is a graph comparing a loss coefficient of the composite multi-layered plate shown in FIG. 5 with and without a mixed vibration-absorbing layer.

FIG. 13 is a graph comparing a loss coefficient of the composite multi-layered plate shown in FIG. 5 with and without a mixed vibration-absorbing layer. Here, the mixed vibration-absorbing material improves the loss coefficient in the horizontal direction by a factor of about 1.4 compared to the unmixed layer. The improvement in the orthogonal direction is by a factor of about 1.5.

Figure 14:
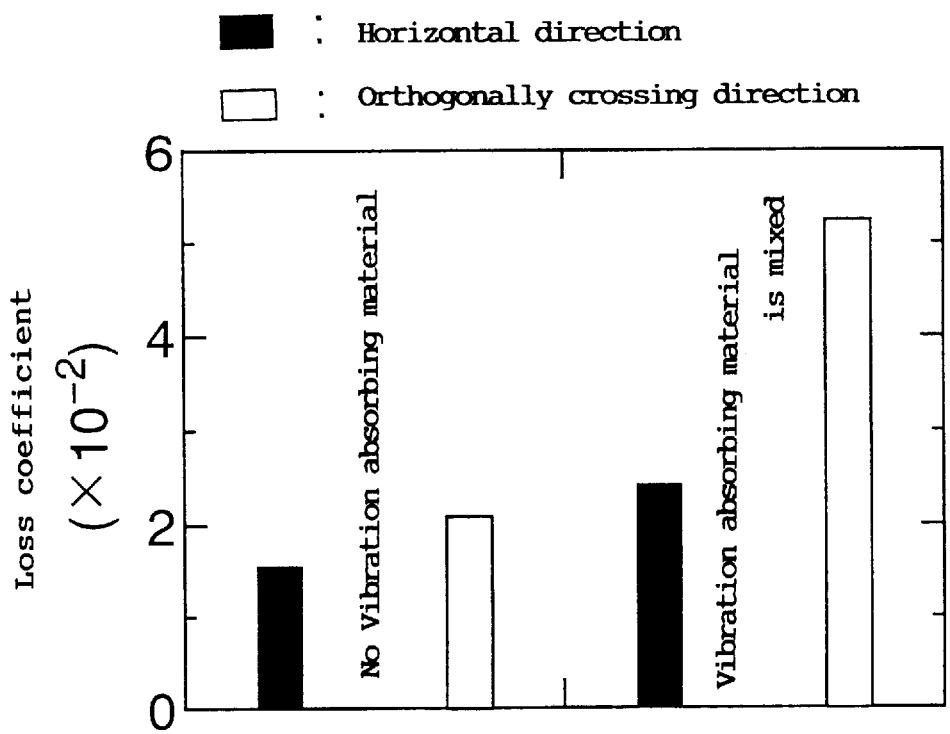
FIG. 14 is a graph comparing a loss coefficient of the composite multi-layered plate shown in FIG. 5 with and without a mixed vibration-absorbing layer.

FIG. 14 is a graph comparing a loss coefficient of the composite multi-layered plate shown in FIG. 5 with and without a mixed vibration-absorbing layer. Here, the mixed vibration-absorbing material improves the loss coefficient in the horizontal direction by a factor of about 1.5 compared to the unmixed layer. The improvement in the orthogonal direction is by a factor of about 2.5.

From above test results, it can be seen that the loss coefficient of the composite multi-layered material can be significantly increased by providing a mixed vibration-absorbing material. Moreover, when the layering structure is changed, the degree of increase of the loss coefficient is also changed. That is, it will be understood that a design of the loss coefficient is possible by changing the layering structure.

Figure 15A:
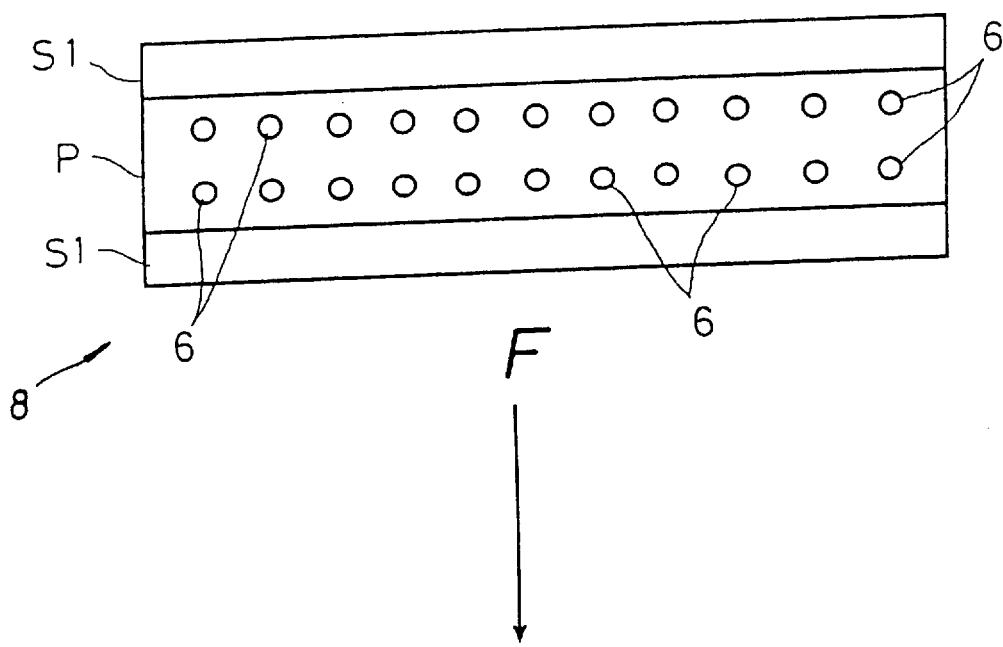
FIGS. 15(a) and (b) are diagrammatic cross sectional views which illustrate an operational concept of the shock/vibration-absorbing layer in accordance with the present invention.
Figure 15B:
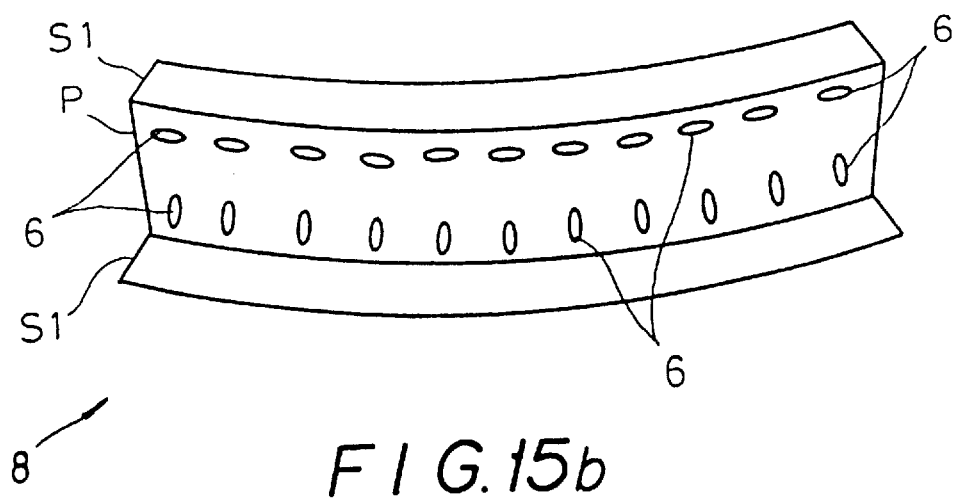

FIGS. 15($a$) and ($b$) are diagrammatic cross sectional views which illustrate an operational concept of the mixed shock/vibration-absorbing layer P in accordance with the present invention. In the drawings, S1 is the structural layer, P is the shock/vibration-absorbing layer, 6 is a pellet shaped resin used as the small piece and/or a vibration-absorbing material. The composite multi-layered material 8 is shown in a normal (e.g., non-deformed) state in FIG. 15($a$), and in a deformed shape in FIG. 15($b$) which is caused by vibration energy due to an applied force F.

During deformation, an upper side portion of the shock/vibration-absorbing layer P is expanded in the horizontal direction. The pellet shaped resin used as the small piece and/or vibration-absorbing material is also expanded horizontally as indicated by the horizontally oblong pellets 6. Moreover, a lower side portion of the layer P is contracted along with the pellets. Thus, it is thought that the vibration energy is substantially concentrated to a deformation of the shock/vibration-absorbing layer, and converted to a thermal energy whereby it is dissipated. Further, it is known that a loss coefficient of a conventional lumbered product is approximately 0.007, and relative to this, it will be understood that a loss coefficient of the product in accordance with the present invention has a high value in any of the cases as shown in FIGS. 11 to 14.

FIG. 16 is a graph illustrating a change of Young's coefficient when the total weight of the structural layer and shock/vibration-absorbing layers are equal, and the arrangement of the layers is varied. In this case, the composite multilayered material has a specific weight of 0.7 as in each of the aforementioned embodiments, and the shape is 400 mm×400 mm in length by breadth, and 12 mm in thickness. The ordinate is Young's bending coefficient, while the abscissa is the distance from the upper surface of the structural layer S1 to the upper surface of the composite multi-layered material. Thus, when the abscissa is zero, the upper surface of the composite multi-layered material and the upper surface of the structural layer are coincident. In other words, the surface layer is structured by a structural layer (finely split piece layer) S1 as shown in FIG. 3. Similarly, when the abscissa is 3 mm, the upper surface of the structural layer is located 3 mm from the surface of the material, and the surface layer is structured by a shock/vibration-absorbing layer P having a thickness of 3 mm as shown in FIG. 4, for example.

A cross section design of the composite multi-layered material satisfying a particular demand capacity is possible by using this graph. For instance, a plate material used for a molding frame of concrete filling-in requires a Young's coefficient of about $70\times10^4$ kgf/cm$^2$ in the horizontal (e.g., parallel). direction. Referring to the solid line of the graph, it can be seen that an abscissa value of about 1 mm corresponds to the desired Young's coefficient. Accordingly, the top layer of the multi-layer composite will be a 1 mm thick P layer. For symmetry, the bottom layer will also be a 1 mm thick P layer. Moreover, assuming a plate thickness of 12 mm, for example, a suitable layering structure is, beginning from the top layer: P layer (1 mm)+S1 layer (3 mm)+P layer (4 mm)+S1 layer (3 mm)+P layer (1 mm). Thus, a composite multi-layered plate having a capacity required for a concrete molding frame can be obtained.

Figure 17:
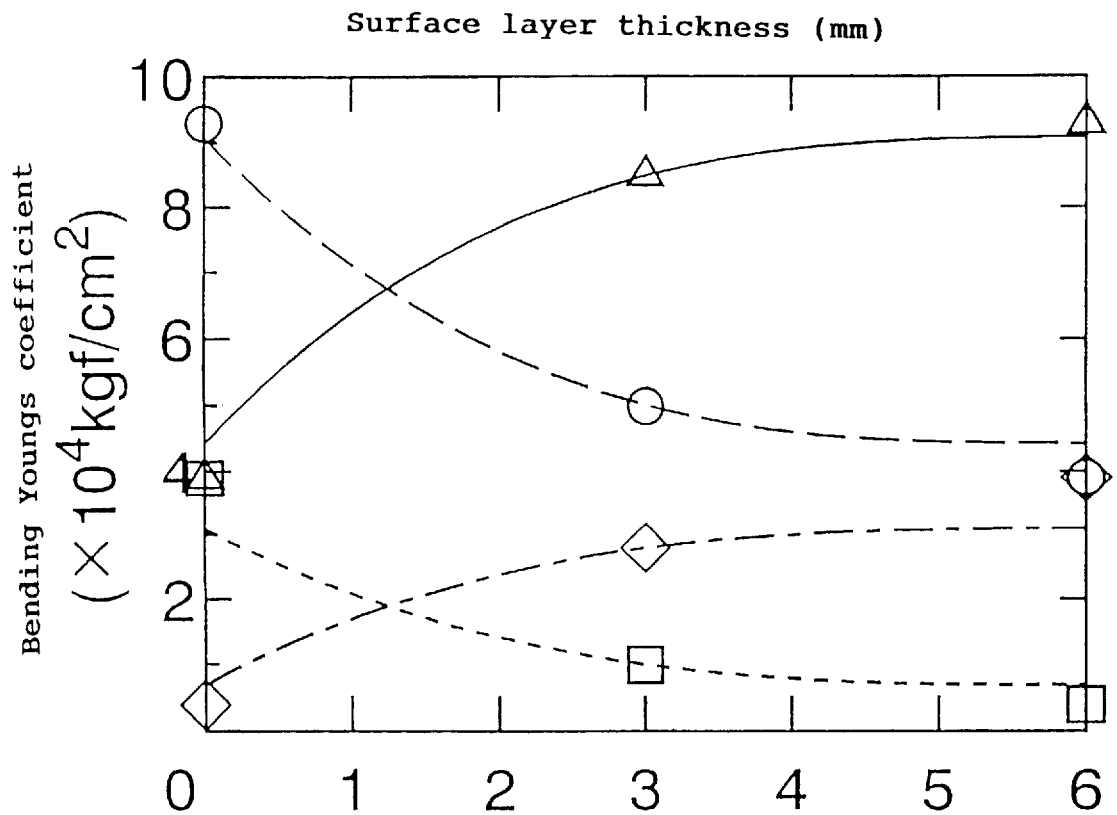
FIG. 17 is a graph illustrating a relation of Young's coefficient and the changes of weight ratio of the structural layer and the shock/vibration-absorbing layer, where the arrangement of the layers is constant.

FIG. 17 is a graph illustrating a relation of Young's coefficient and the changes of weight ratio of the structural layer and the shock/vibration-absorbing layer, where the arrangement of the layers is constant. Various configurations of a composite multi-layered material having three layers are considered. The ordinate of the graph is Young's bending coefficient. The abscissa is the thickness of the top (e.g., surface) layer regardless of whether it is a P layer or an S1 layer.

The graph illustrates a change of Young's coefficient when the weight distribution (and corresponding thickness) of the layers changes for a given layer arrangement. Two layer arrangements are considered, namely S1+P+S1, where there are two outer S1 layers and the middle layer is a P layer, and P+S1+P, where there are two outer P layers and the middle layer is an S1 layer. As before, the composite multi-layered material has a specific weight of 0.7, and the shape is 400 mm×400 mm in length by breadth, and 12 mm in thickness.

For example, with an abscissa value of 1 mm, surface layers (e.g., outer layers) will have a thickness of 1 mm. Additionally, with an S1+P+S1 layer configuration, the thickness and weight of each layer will be: S1 (1 mm, weight 112 g)+P (10 mm, weight 1124 g)+S1 (1 mm, weight 112 g). With a P+S1+P layer configuration, the thickness and weight of each layer will be: P (1 mm, weight 112 g)+S1 (10 mm, weight 1124 g)+P (1 mm, weight 112 g).

Furthermore, referring to the solid line which includes triangles, it can be seen that a S1+P+S1 layer configuration with a 1 mm surface layer corresponds to a Young's bending coefficient in the horizontal direction of about $62\times10^4$ kgf/cm$^2$. Referring to the broken line which includes squares, it can be seen that a S1+P+S1 layer configuration with a 1 mm surface layer corresponds to a Young's bending coefficient in the orthogonal direction of about $20\times10^4$ kgf/cm$^2$.

Referring to the broken line which includes circles, it can be seen that a P+S1+P layer configuration with a 1 mm surface layer corresponds to a Young's bending coefficient in the horizontal direction of about $72 \times 10^4$ kgf/cm$^2$. Referring to the broken line which includes diamonds, it can be seen that a P+S1+P layer configuration with a 1 mm surface layer corresponds to a Young's bending coefficient in the orthogonal direction of about $18 \times 10^4$ kgf/cm$^2$. Thus, a cross section design corresponding to a required capacity can be determined.

Although the invention has been described in connection with various specific embodiments, those skilled in the art will appreciate that numerous adaptations and modifications may be made thereto without departing from the spirit and scope of the invention as set forth in the claims. For example, while three- and seven layer-composite materials have been disclosed herein, any number of layer may be used. Moreover, the specific dimensions of the multi-layer material and its constituent elements disclosed have been selected as examples only.

What is claimed is:

1. A method for manufacturing a composite multi-layered material, comprising the steps of:

(a) splitting a fibrous raw material comprising at least one of wood and bamboo along a fiber direction to form a first plurality of elongated pieces of said raw material;

(b) further splitting said first plurality of elongated pieces of said raw material along the fiber direction to form a second plurality of elongated pieces of said raw material;

(c) drying said second plurality of elongated pieces of said raw material to form elongated dried pieces;

(d) arranging said elongated dried pieces substantially parallel to one another in at least a first structural layer;

(e) applying a first adhesive agent to said elongated dried pieces in said first structural layer to cause said elongated dried pieces to be adhered together in a first adhered structural layer;

(f) arranging at least said first adhered structural layer with at least one vibration/shock-absorbing layer in a plurality of layers in an alternating manner to form a multi-layered structure;

(g) pressing said multi-layered structure to a predetermined thickness thereby causing said plurality of layers to adhere to one another to provide said multi-layered structure as a unitary body;

wherein said at least one vibration/shock absorbing layer is obtained by the steps of:

(h) providing a plurality of small pieces comprising at let one of wood and bamboo which are smaller than said elongated dried pieces;

(i) drying said small pieces to form small dried pieces;

(j) distributing said small substantially uniformly in said at least one vibration/shock absorbing layer; and (k) applying a second adhesive agent to said small dried pieces to cause said small dried pieces to be adhered together in a first adhered vibration/shock absorbing layer;

(l) providing a plurality of resin pellets as load bearing elements;

(m) distributing said resin pellets in said at least one vibration/shock absorbing layer; and (n) applying said second adhesive agent to said plurality of resin pellets to cause said resin pellets to be adhered together in said first adhered vibration/shock absorbing layer.

2. The method of claim 1, comprising the further steps of:

(o) providing a third adhesive agent between said first adhered structural layer and said at least one vibration/shock-absorbing layer in said multi-layered structure prior to said pressing step;

wherein said pressing step solidifies said third adhesive agent while maintaining said predetermined thickness; and (p) terminating said pressing step after said third adhesive agent of said multi-layered structure has solidified to obtain said multi-layered material.

3. The method of claim 2, comprising the further steps of:

(g) heating said multi-layered structure to a temperature of approximately 180° C. substantially concurrently with said pressing step to improve an adhering effect of said third adhesive agent.

4. The method of claim 1, wherein:

a total weight of the structural layer(s) is approximately equal to a total weight of the vibration/shock absorbing layer(s).

5. The method of claim 1, wherein:

a weight of said first adhesive agent is approximately ten percent of a weight of said second plurality of elongated pieces.

6. The method of claim 1, wherein:

said second plurality of elongated pieces have a length corresponding to a length of said first structural layer.

7. The method of claim 1, wherein:

said second plurality of elongated pieces have a cross-sectional area of approximately 10 mm×4 mm.

8. The method of claim 1, comprising the further step of:

arranging said elongated dried pieces in said structural layer such that said structural layer has a height corresponding to a height of a plurality of said elongated dried pieces thereof.

9. The method of claim 1, wherein:

said resin pellets comprise a denatured petroleum resin including at least one of polyvinyl chloride, polyurethane, polyvinyl acetate, acrylic resin, natural gum, butadiene-styrene rubber, nitrile rubber, and chloroprene-copolymer, or a mixture thereof.

10. The method of claim 1, wherein at least first and second vibration/shock absorbing layers are provided.

11. The method of claim 10, comprising the further step of:

arranging said first and second vibration/shock absorbing layers as outermost layers of said multi-layered structure.

12. The method of claim 1, comprising the further step of:

distributing said small dried pieces with different orientations in said at least one vibration/shock absorbing layer.

13. The method of claim 1, wherein:

small dried pieces have a cross-sectional area of approximately 4 mm×0.5 mm.

14. The method of claim 1, comprising the further step of:

distributing said small dried pieces in said at least one vibration/shock absorbing layer such that said at least one vibration/shock absorbing layer has a height corresponding to a height of a plurality of said small dried pieces.

15. The method of claim 1, comprising the further steps of:
    arranging said elongated dried pieces substantially parallel to one another in a second structural layer;
    applying a third adhesive agent to said elongated dried pieces in said second structural layer to cause said elongated dried pieces to be adhered together in a second adhered structural layer; and
    arranging said second adhered structural layer with said at least one vibration/shock-absorbing layer in said plurality of layers to form said multi-layered structure.

16. The method of claim 15, comprising the further step of:
    arranging said first and second adhered structural layers as outermost layers of said multi-layered structure.

17. The method of claim 15, comprising the further step of:
    arranging said first and second adhered structural layers in said multi-layered structure such that the elongated dried pieces in the first adhered structural layer are substantially orthogonal to the elongated dried pieces in the second adhered structural layer.

\* \* \* \* \*

UNITED STATES PATENT AND TRADEMARK OFFICE
CERTIFICATE OF CORRECTION

PATENT NO.    : 5,814,170
DATED         : September 29, 1998
INVENTOR(S)   : Shibusawa et al.

It is certified that error appears in the above-identified patent and that said Letters Patent is hereby corrected as shown below:

Column 13, line 93: "let" is changed to --least--.

Column 13, line 57: After "small", --dried pieces-- is inserted.

Signed and Sealed this

Twenty-third Day of February, 1999

Attest:

Attesting Officer

Q. TODD DICKINSON

Acting Commissioner of Patents and Trademarks